Aug. 9, 1960 J. P. KNIGHT Re. 24,854

RIBBON INKING DEVICE

Original Filed Jan. 11, 1952

INVENTOR.
J. P. Knight
BY
ROBERT J. PATCH
ATTORNEY

United States Patent Office

Re. 24,854
Reissued Aug. 9, 1960

24,854

RIBBON INKING DEVICE

John P. Knight, P.O. Box 364, Detroit, Mich.

Original No. 2,725,849, dated Dec. 6, 1955, Ser. No. 266,056, Jan. 11, 1952. Application for reissue Dec. 5, 1957, Ser. No. 702,219

23 Claims. (Cl. 118—260)

Matter enclosed in heavy brackets [ ] appears in the original patent but forms no part of this reissue specification; matter printed in italics indicates the additions made by reissue.

The present invention relates generally to improvements in the art of printing, and relates more particularly to improvements in the construction and operation of ink transfer devices.

A primary object of this invention is to provide an improved device for supplying ink to the ribbons of diverse types of printing machines which is extremely simple, compact and durable in construction, and which is moreover highly efficient and economical in operation.

In typewriters, tabulators and various other printing machines, it is customary to utilize an ink bearing ribbon interposed between the sheet being printed and the type or impression plates of the machine for transferring the printed impression to the sheet. Such ribbon is termed "transfer ribbon" in this application. While these ink carrying ribbons may initially be supplied with a fair quantity of ink and may be fed through the machine several times, the initial ink supply ultimately becomes exhausted and a fresh ribbon is necessary for effective printing. To obtain the maximum use from these ink carrying ribbons and to minimize the need for frequent replacement, it has heretofore been proposed to provide means including an "inking roller" for constantly supplying fresh ink to the ribbon to augment the initial supply as the machine is used; and one type of ribbon inking device that has proven highly successful for such purpose is shown and described in my co-pending application Serial No. 196,395, filed November 18, 1950, and entitled Device for Supplying Ink to Ribbons, now Patent No. 2,645,202. However, due to the failure to provide means for accurately adjusting and governing the ink flow to the ribbon in sufficiently small and uniform quantities as will not over-saturate the ribbon, the commercially successful application of these prior ribbon inking devices has necessarily been restricted to machines producing a relatively large number of letters or characters per printing cycle; and they have not been completely satisfactory from a commercial standpoint for supplying ink to ribbons such as used in typewriters and the like for single character impressions per printing cycle.

It is therefore a more specific object of my present invention to provide an improved ribbon inking device which obviates most of the objections and disadvantages heretofore attendant prior inking devices.

Another specific object of the invention is to provide an improved ribbon inking apparatus wherein any desired quantity of ink may be supplied to the ribbon with utmost precision by a novel ink supply roller peripherally coacting with the ribbon.

Another specific object of this invention is to provide an improved device for constantly supplying desired quantities of fresh ink to the ribbon of a printing machine and in which the supply of ink to the ribbon may be accurately regulated by feeding the fresh ink to the roller periphery at different points axially therealong.

Another specific object of my invention is to provide an improved ribbon inking device which is of unitary construction and wherein fresh ink is fed to intermittent active ink receiving portions of the periphery of an ink transfer roller by an ink feeding wick which is adjustable both axially and radially of the roller in a simple and positive manner.

A further specific object of my present invention is to provide an improved device for supplying fresh ink from a source of supply to the ribbon of a printing machine and which employs a flexible wick having a specially treated and hardened ink delivery end for feeding ink to the periphery of a transfer roller.

Still another specific object of the present invention is to provide an improved ribbon inking device comprising, an ink transfer roller having a peripheral ink transfer surface cooperable with an ink supply source to transfer variable predetermined quantities of ink to the ribbon of a printing machine.

These and other specific objects and advantages of the invention will be apparent from the following detailed description.

A clear conception of the features constituting the present improvement, and of the mode of constructing and of utilizing ribbon inking devices embodying the invention, may be had by referring to the drawing accompanying and forming a part of this specification wherein like reference characters designate the same or similar parts in the various views.

Figures 1, 2, 3, 4, 5, 6:
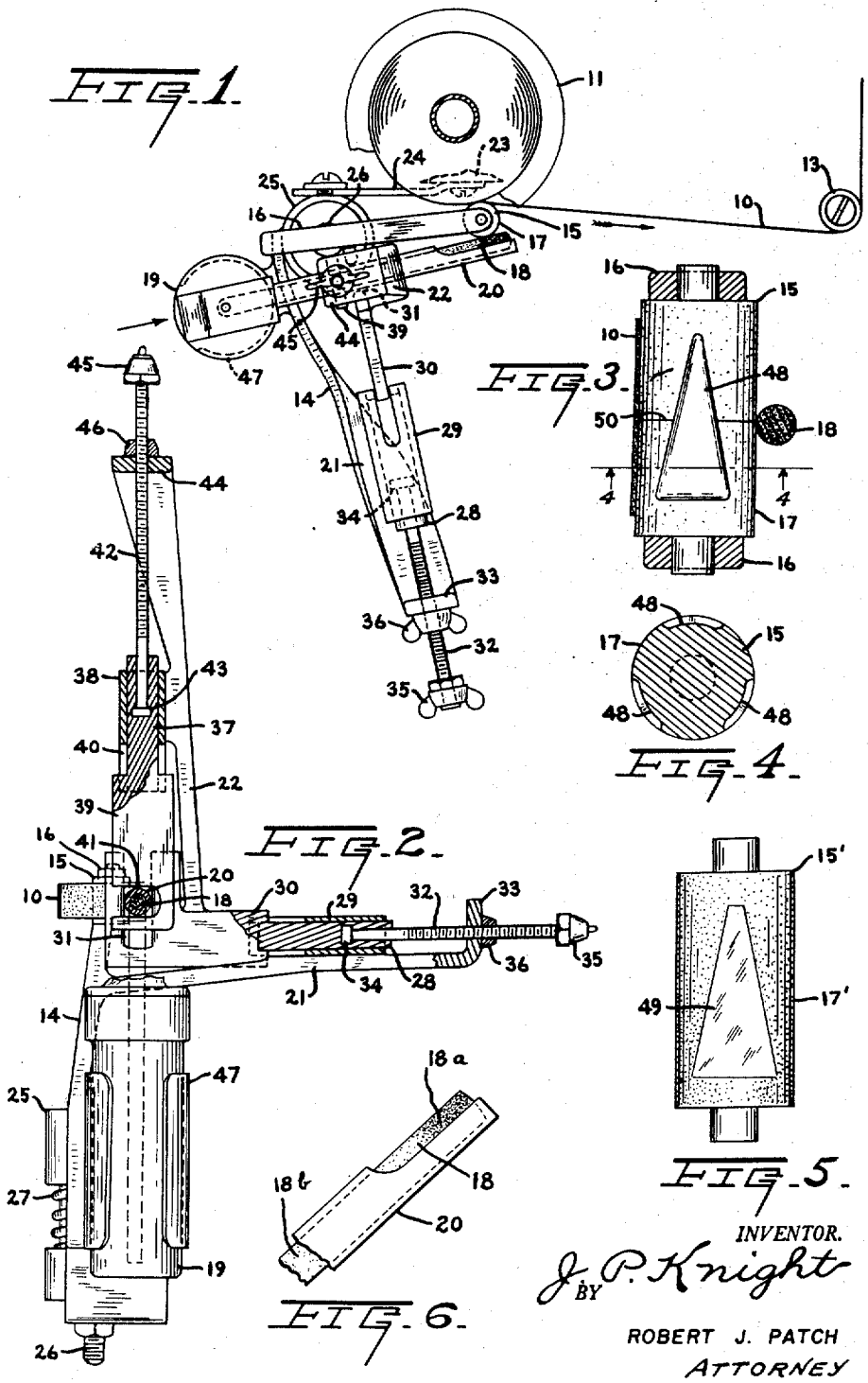
Fig. 1 is a top view of a typical inking device constructed in accordance with the present invention and showing the ink supply roller coacting with the inking ribbon of one type of printing machine.
Fig. 2 is a side view of the improved device taken in the direction of the arrow in Fig. 1 but with some of the parts being broken away and others being shown in section to more clearly reveal normally concealed structure.
Fig. 3 is a somewhat enlarged side view of one of the improved ink supply rollers showing the mounting bearings, ribbon, and ink feeding wick applied thereto and shown in section.
Fig. 4 is a transverse section through the roller of Fig. 3 taken along the line 4—4; [and]
Fig. 5 is a similarly enlarged side view of a somewhat modified ink supply roller also embodying the invention; *and*
*Fig. 6 is an enlarged fragment of Fig. 1 showing the exposed end of the wick.*

While the invention has been specifically shown and described herein as being particularly applicable to continuous inking devices for supplying ink to ribbons used in machines adapted to print single character impressions, it is not desired or intended to thereby unnecessarily limit the scope or utility of the improvement; and it is furthermore contemplated that certain descriptive terms used herein shall be given the broadest possible interpretation consistent with the disclosure.

Referring to the drawing, the improved inking device is illustrated as supplying fresh ink to the surface of an ink transfer ribbon 10 being continuously fed from a spool 11 past a guide roll 13 in the direction of the feathered arrow in Fig. 1 to a printing machine, not shown. The improved device comprises, in general, a unitary supporting frame 14, a fresh ink supply roller 15 journalled for rotation in a laterally extending arm 16 of the main frame 14 and having a peripheral ink transfer surface 17 coacting with a surface of the ribbon 10, means such as a suitable flexible wick 18 extending from within an ink containing cartridge 19 through a rigid tube 20 to the periphery of the roller 15 for supplying fresh ink as by capillarity from the cartridge to an active circumferential ink receiving portion of the roller 15, means carried by another laterally extending arm 21 of the main frame 14 and coacting with the wick holding tube 20 for moving the ink delivery end of the wick 18 toward and away from the periphery of the roller 15 and for effecting adjustment of the wick radially of the roller, and other means carried by an arm 22 and projecting upwardly from the radial adjustment means and also coacting with the wick holding tube 20 for moving the ink delivery end of the wick 18 transversely across the periphery of the roller 15 and for effecting adjustment of the wick axially of the roller.

To maintain the peripheral ink transfer surface of the roller 15 in proper contact with the coiled ribbon 10, the unitary main frame 14 is swingably mounted on a stationary support 23 as by means of a mounting bracket 24 having a collar 25 or the like at its other end which embraces a pivot pin 26 carried by the lower end of the frame 14 to thereby provide a hinge, the collar 25 carrying a spring 27 having one end cooperable with the frame 14 and the other end cooperable with the bracket or mounting plate 24 so as to constantly resiliently urge the main frame 14 counterclockwise about the pivot 26 and the roller 15 into contact under spring pressure with the ribbon 10 being withdrawn from the spool 11. As more clearly shown in section in Fig. 2, the radial wick adjusting mechanism preferably comprises a reciprocable plunger 28 guided for axial movement only in a guide cylinder 29 rigidly secured to the arm 21 of the main frame, the plunger 28 being provided at one end with a flattened projection 30 having an upwardly open slot or groove 31 for receiving the wick containing tube 20 and at its opposite end with an adjustment screw 32 medially journalled in an upstanding lug 33 of the arm 21 and having one end swivelled as at 34 in the plunger 28 with the other end being provided with a winged manipulating head 35 and a winged lock nut 36 for effecting and maintaining adjustments. The mechanism for effecting adjustments of the wick axially of the roller 15 is similar to that just described for effecting radial adjustments except that the supporting arm 22 is secured to or formed integral with the wick engaging projection 30 of the radial adjustment mechanism instead of being formed integral with the frame 14; and this axial adjustment mechanism comprises a reciprocable plunger 37 guided for axial movement in a guide cylinder 38 secured to the upstanding arm 22, the plunger 37 being restrained from rotation by a flattened projection 39 extending from one end thereof and operating in a slot 40 formed in the cylinder 38, the projection or extension 39 also having an open slot 41 for receiving the tube 20 and the plunger 37 having an operating screw 42 swivelled as at 43 in its opposite end and extending through a lug 44 of the arm 22 with a winged head 45 and lock nut 46 being carried by the screw 42 for effecting and maintaining the desired adjustments. Since it is desirable to form the ink cartridge 19 and wick carrying tube 20 as a unitary and integral assemblage for merchandising and handling purposes, it is necessary to provide a mounting means for such assembly which will permit movement thereof responsive to the adjustments effected; and this may be accomplished by providing a mounting bracket of the type shown and consisting of a spring clip 47 secured to the frame 14 and adapted to receive and retain the cylindrical cartridge for axial as well as rotational movement.

Since the fluent ink delivered by the wick 18 to the roller 15 has considerable affinity for the ribbon 10 and is spread quite rapidly in the ribbon by capillarity, the band of ink delivered to the roller 15 by the wick 18 ordinarily tends to over-saturate the ribbon 10 despite adjustments of the delivery end of the wick radially of the roller as hereinabove described; and to obviate this difficulty and enable extremely delicate control in the quantity of ink delivered to the peripheral ink transfer surface 17 of the roller15, I provide novel means for locally varying, for example by intermittently feeding fresh ink to an active circumferential ink receiving portion of the roller. By thus locally delivering the fresh ink only to intermittent circumferential portions of the roller 15, the amount of ink transferred to the periphery of the roller and then to the ribbon 10 may be effectively controlled within exceeding fine limits, and such intermittent ink delivery may be readily accomplished either with the roller shown in Figs. 3 and 4 or with the roller shown in Fig. 5. Referring particularly to Figs. 3 and 4, the peripheral ink transfer surface 17 of the roller 15 is provided with circumferentially spaced recesses 48 which are not contacted by the wick 18 during rotation of the roller 15 by the advancing ribbon 10 and therefore are inactive in receiving or transferring ink, thereby providing for the delivery of ink as a band 50 only to the intermittent circumferential active portions of the roller periphery between the recessed portions 48. It is also preferable to polish the recessed portions 48 since polished surfaces of the metal roller tend to repel ink, and it is furthermore desirable to round or provide a radius at the corners of the recesses 48 to minimize wear on the ribbon and also minimize possible collection of ink in the corners. With reference to Fig. 5, the roller 15' therein shown is provided with a roughened active peripheral ink transfer surface 17' interrupted with circumferentially spaced polished portions or areas 49 which tend to intermittently repel ink during rotation of the roller 15'. It will be noted that in both Figs. 3 and 5 the inactive portions 48, 49 respectively are of generally triangular or polygonal shape so as to provide inactive or ink repellant portions of varying width at different points axially of the rollers; and while this formation of the inactive areas is desirable and enable accurate adjustments in the delivery of fresh ink to greater or lesser active peripheral surfaces by mere adjustments in the wick 18 axially of the roller, these inactive portions 48 and 49 may be of any desired shape such as rectangular and any desired number of inactive areas may likewise be provided. This example illustrates, however, varying the active ink transfer surface along the roller, as by varying the circumferential area of the active surface.

To further prevent oversupply of fresh ink to the roller 15 and ribbon 10 and to provide for point contact only of the delivery end of the wick 18 with the periphery of the transfer roller so as to maintain the band 50 of ink narrow and constant, I have also found that it is extremely beneficial to treat the delivery or roller contacting end of the wick in a special manner for use with my improved apparatus, although such specially treated wicks may also be employed to advantage with other ribbon inking devices. It has been found that conventional wicks possess several serious objections, namely, they are not constant in their delivery of ink particularly at times of intermittent activity due to the fact that the wick becomes uniformly saturated during idleness but becomes naturally less saturated and gradually diminishes as the ink is supplied to the roller for transfer to the ribbon during the inking operations thus resulting in considerable variations in the delivery; secondly, the conventional wicks are relatively flexible and soft throughout their length and tend to flatten against the roller surface at the delivery end thereby causing the transfer of objectionably wide bands of ink to the roller; and finally the capillarity between the round conventional wick and the roller surface prevents close control particularly during times of maximum or complete saturation of the wick when the fluent ink tends to spread by capillarity from the convexly rounded surface of the wick to the roller surface. I have discovered that these objections can be obviated by treating the wick fibers at the delivery or roller contacting end only of the wick in a special manner either by reducing the capillarity of the fibers themselves or by filling in the interstices between the fibers. Where the wick fibers are porous and/or absorbent such as silk or felt, the capillarity of the fibers may be advantageously reduced as by coating the surface of the fibers or by filling in the pores and cracks on the surface or by destroying partially or completely the absorbency of the fibers either by making the fibers rigid to eliminate swelling or by causing the fibers to absorb solid material to reduce their capacity to absorb and transmit liquid; and whether the fibers are absorbent or not, the treatment may advantageously be effected by filling in the interstices. One special treatment which I have found satisfactory consists of the application of a solution of a suitable resinous material such as acrylic resin, in a viscosity about that of water, to the delivery end of the wick, the volatile solvent subsequently evaporating and leaving the resin in and/or on the surface of the wick fibers and causing the delivery or roller contacting end *18a* of the wick to harden beyond the major body portion *18b* thereof. By reason of such special treatment, compression of the delivery end of the wick upon application to the roller is prevented or, at least, greatly reduced, and the capilliarity between the wick and the roller is effectively reduced. Further, the hardened wick surfaces tends to bridge and restrict ink flow at the recessed areas of the roller, and in addition, by thus retarding or restricting the ink flow at the delivery end of the wick with the major body portion remaining untreated assures an abundant supply of ink to the treated end at all times and thereby eliminates any variations in delivery of ink to the roller even during intermittent use of the device. In view of these advantages of my novel wick, such wicks may be successfully employed with my present improved inking apparatus, and the wick treatment thus described is also recommended as an improvement in the preparation of ink cartridges as described in my co-pending application Serial No. 785,253, filed November 12, 1947, now Patent No. 2,599,561.

From the foregoing detailed description, it is believed apparent that this invention provides a ribbon inking device which is exceedingly simple, compact and durable in construction and which is moreover extremely economical in operation and highly flexible in its adaptations. The provision of the improved roller, 15, 15' with the intermittently active peripheral ink receiving and transfer portions of varying width at different points axially of the roller provides for delicate regulation of the ink supply to the roller upon adjustment of the wick 18 to different positions axially of the roller; and while these rollers have been shown and described for use with a specific type of inking device for supplying fresh ink to typewriter ribbons or the like, these rollers can nevertheless be used to advantage with other devices such as, for example, that shown and described in my co-pending application, Serial No. 196,395. The main supporting frame 14 is of unitary construction adapted for ready mounting so that the roller will maintain proper peripheral contact with the ribbon 10, and all parts of the device are readily accessible for repair or replacement. The wick 18 may also be quickly and easily adjusted either radially of the roller 15 or axially thereof by simple manipulation of the proper adjustment screw and lock nut in an obvious manner, and the ink supply cartridge 19 may be readily removed longitudinally from its retaining clamp for replacement.

It should be understood that it is not desired to limit this invention to the extact details of construction or to the precise mode of use herein shown and described, since various modifications within the scope of the appended claims may occur to persons skilled in the art to which this invention pertains.

I claim:

1. Apparatus for supplying ink to the ribbon of a printing machine comprising, an ink transfer roller having an active peripheral ink transfer surface interrupted by inactive ink repellant portions of gradually increasing width longitudinally of said roller and lying in a plane perpendicular to the axis of rotation of said roller, means for rotatably supporting said roller in peripheral contact with the ribbon, and axially adjustable means for feeding ink to the periphery of said roller in said plane.

2. Apparatus for supplying ink to the ribbon of a printing machine comprising, an ink transfer roller having an active circumferential ink transfer surface interrupted by an inactive ink repellent portion of varying width at different points axially of said roller, means for rotatably supporting said roller in peripheral contact with the ribbon, means for locally feeding ink to the active circumferential portion of said roller, and means for effecting adjustment of said ink feed means axially of said roller.

3. Apparatus for supplying ink to the ribbon of a printing machine comprising, an ink transfer roller having an active peripheral ink transfer surface interrupted by a polished inactive ink repellant portion of varying width at different points axially of said roller, means for rotatably supporting said roller in peripheral contact with the ribbon, means for locally feeding ink to the active peripheral surface of said roller, and means for effecting adjustment of said ink feed means axially of said roller.

4. Apparatus for supplying ink to the ribbon of a printing machine comprising, an ink transfer roller having an active roughened peripheral ink transfer surface interrupted by spaced polished inactive ink repellant portions of generally triangular shape, means for rotatably supporting said roller in peripheral contact with the ribbon, means for locally feeding ink to the active peripheral surface of said roller, and means for effecting adjustment of said ink feed means axially of said roller.

5. Apparatus for supplying ink to the ribbon of a printing machine comprising, an ink transfer roller having an active peripheral ink transfer surface interrupted by a recessed inactive ink repellant portion of varying width at different points axially of said roller, means for rotatably supporting said roller in peripheral contact with the ribbon, means for locally feeding ink to the active peripheral surface of said roller, and means for effecting adjustment of said ink feed means axially of said roller.

6. Apparatus for supplying ink to the ribbon of a printing machine comprising, an ink transfer roller having an active peripheral ink transfer surface interrupted by circumferentially spaced recessed inactive ink repellant portions of generally triangular shape, means for rotatably supporting said roller in peripheral contact with the ribbon, means for locally feeding ink to the active peripheral surface of said roller, and means for effecting adjustment of said ink feed means axially of said roller.

7. Apparatus for supplying ink to the ribbon of a printing machine comprising, a unitary supporting frame, an ink transfer roller journalled for rotation in a laterally extending arm of said frame and having a peripheral ink transfer surface of varying width axially of said roller coacting with the ribbon, an ink supply cartridge mounted on said frame, a wick communicating at one end with the ink in said cartridge and having its opposite end coacting with the periphery of said roller for delivering ink thereto, means carried by another arm of said frame for adjusting the delivery end of said wick radially toward and away from the periphery of said roller, and means carried by said radial adjustment means for adjusting the delivery end of said wick axially along the periphery of said roller.

8. Apparatus for supplying ink to the ribbon of a printing machine of the type using a transfer ribbon, comprising, an inking roller having a surface of varying ink transfer character, said surface character varying in axial direction along the roller, whereby the ink supply to said ribbon may be varied along the roller.

9. Apparatus for supplying ink to the ribbon of a printing machine of the type using a transfer ribbon, comprising, an inking roller having a surface of relatively active ink transfer character, said active surface being interrupted by areas of relatively inactive ink transfer character and said active surface varying in circumferential area in axial direction along the roller.

10. Apparatus for supplying ink to the ribbon of a printing machine of the type using a transfer ribbon, comprising, an inking roller having a surface of relatively active ink transfer character, said active surface being interrupted by areas of relatively inactive ink transfer character and said active surface varying in circumferential area in axial direction along the roller, and means for feeding ink to said roller, said means being adjustable in axial direction along the roller, whereby ink supply to a ribbon may be varied along the roller.

11. Apparatus for supplying ink to the ribbon of a printing machine of the type using a transfer ribbon, comprising, an inking roller having a surface of ink-transfer character, said surface being interrupted by portions of non-ink-transfer character varying in circumferential area in axial direction along said roller surface.

12. Apparatus for supplying ink to the ribbon of a printing machine of the type using a transfer ribbon, comprising, an inking roller having a surface of ink-transfer character, said surface being interrupted by a recess of relatively inactive ink transfer character varying in circumferential area in axial direction along said roller surface, said inactive recess comprising a smooth surface.

13. Apparatus for supplying ink to the ribbon of a printing machine of the type using a transfer ribbon, comprising, an inking roller having a surface of ink-transfer character, interrupted by one or more regions of lesser ink-transfer character that vary in said character in axial direction along the roller surface, said lesser ink-transfer regions comprising rounded recesses of polished smoothness.

14. Apparatus for supplying ink to the ribbon of a printing machine of the type using an ink transfer ribbon, comprising, an inking roller having a surface of ink-transfer character, said surface being interrupted by one or more recesses of non-ink-transfer character varying in circumferential area in axial direction along the roller surface, and means for feeding ink to the roller comprising a wick having a body portion of relatively high capillary quality for transfer of ink from a supply, and a roller-contacting surface portion of ink-feeding properties but of relatively less capillary quality and of harder structure to bridge said roller recesses, whereby ink to a ribbon may be supplied in controlled amounts.

[15. Apparatus for supplying ink to a ribbon-inking roller for a printing machine of the type using a transfer ribbon, comprising, an extensive wick portion of relatively high capillary quality for transfer of ink from a supply and a portion of relatively less capillary quality, said latter portion having a roller-contacting surface exposed and structurally adapted to deliver ink to an inking roller, whereby relatively abundant supply of ink through the wick is restricted at said roller-contacting surface to minimize variations in ink delivery.]

[16. Apparatus for supplying ink to a ribbon-inking roller for a printing machine of the type using a transfer ribbon, comprising, an extensive wick portion of relatively high capillary quality for transfer of ink from a supply, said portion being enclosed but having a part exposed and structurally adapted to contact an inking roller, said latter exposed part having its exposed surface of ink-feeding properties but of relatively less capillary quality than the enclosed portion, whereby relatively abundant supply of ink through the wick is restricted at said roller-contacting surface to minimize variations in ink delivery.]

[17. Apparatus for supplying ink to a ribbon-inking roller for a printing machine of the type using a transfer ribbon, comprising, an extensive wick portion of relatively high capillary quality and relatively soft body for transfer of ink from a supply, said wick having a surface portion exposed and structurally adapted to contact an inking roller, said surface portion being of ink-feeding properties but of relatively less capillary quality than the said soft body and having its exposed roller-contacting surface relatively harder than said soft portion, whereby delivery of ink from said surface tends to be uniform despite fluctuations in supply and whereby said harder surface tends to bridge any inequalities in an inking roller.]

18. Apparatus for supplying ink to a ribbon-inking roller for a printing machine of the type using a transfer ribbon, comprising, an adjustably mounted substantially enclosed wick for transferring ink from a supply to the inking roller, and adjusting means for said wick engaging the enclosure thereof in opposed directions to hold the wick in adjusted position.

*19. Apparatus for supplying ink to a ribbon-inking roller for a printing machine of the type using a transfer ribbon, comprising, an extensive wick portion of relatively high capillary quality for transfer of ink from a supply of ink with which part of said wick portion is in contact, means enclosing said wick portion but leaving a part exposed and structurally adapted to contact an inking roller, said exposed part having ink-feeding properties but having internal structure adjacent and extending up to and terminating at its roller-contacting surface of relatively less capillary quality than the enclosed portion, whereby relatively abundant supply of ink through the wick is restricted by said exposed part to minimize variations in ink delivery.*

*20. Apparatus for supplying ink to a ribbon-inking roller for a printing machine of the type using a transfer ribbon, comprising, an extensive wick portion of relatively high capillary quality for transfer of ink from a supply of ink with which part of said wick portion is in contact, means enclosing said wick portion but leaving a part exposed and structurally adapted to contact an inking roller, said exposed part having ink-feeding properties but having internal structure adjacent and extending up to and terminating at its roller-contacting surface of relatively less capillary quality than the enclosed portion, whereby relatively abundant supply of ink through the wick is restricted by said exposed part to minimize variations in ink delivery, said exposed part having internal structure adjacent and extending up to and terminating at its roller-cotacting surface substantially harder than the enclosed portion so as to render said exposed part rigid.*

*21. Apparatus for supplying ink to a ribbon-inking roller for a printing machine of the type using a transfer ribbon, comprising, a container, a supply of liquid ink in the container, an elongated wick having an exposed part adapted to contact an inking roller, means mounting the wick in assembly with the container with said exposed part of the wick spaced from said supply of ink, the wick having a main body portion, part of said main body portion of the wick being immersed in said supply of ink, said exposed part of the wick having ink-feeding properties but having internal structure adjacent and extending up to and terminating at its roller-contacting surface of relatively less capillary quality than said main body portion, whereby relatively abundant supply of ink through the wick is restricted by said exposed part to minimize variations in ink delivery.*

*22. Apparatus for supplying ink to a ribbon-inking roller for a printing machine of the type using a transfer ribbon, comprising, a container, a supply of liquid ink in the container, an elongated wick having an exposed part adapted to contact an inking roller, means mounting the wick in assembly with the container with said exposed part of the wick spaced from said supply of ink, the wick having a main body portion, part of said main*

*body portion of the wick being immersed in said supply of ink, said exposed part of the wick having ink-feeding properties but having internal structure adjacent and extending up to and terminating at its roller-contacting surface of relatively less capillary quality than said main body portion, whereby relatively abundant supply of ink through the wick is restricted by said exposed part to minimize variations in ink delivery, and substantially harder than said main body portion so as to render said exposed part rigid.*

*23. Apparatus for supplying ink to a ribbon-inking roller for a printing machine of the type using a transfer ribbon, comprising, an elongated wick, a major portion of the wick being of relatively high capillary quality for relatively abundant transfer of ink from a supply of ink with which part of said major portion of the wick is in contact, means enclosing said major portion of the wick but leaving part of the wick exposed, said exposed part of the wick having a surface adapted to contact an inking roller, said exposed part of the wick being impregnated with a substance that reduces but does not destroy the capillary quality of said exposed part, said major portion of the wick being spaced from said roller-contacting surface by the impregnated exposed part of the wick, the impregnation of the exposed part of the wick extending up to and terminating at said roller-contacting surface of the exposed part.*

*24. Apparatus for supplying ink to a ribbon-inking roller for a printing machine of the type using a transfer ribbon, comprising, an elongated wick, a major portion of the wick being relatively soft and of relatively high capillary quality for relatively abundant transfer of ink from a supply of ink with which part of said major portion of the wick is in contact, means enclosing said major portion of the wick but leaving part of the wick exposed, said exposed part of the wick having a surface adapted to contact an inking roller, said exposed part of the wick being impregnated with a hardened substance that renders said exposed part substantially harder than said major portion of the wick and that reduces but does not destroy the capillary quality of said exposed part, said major portion of the wick being spaced from said roller-contacting surface by the impregnated exposed part of the wick, the impregnation of the exposed part of the wick extending up to and terminating at said roller-contacting surface of the exposed part.*

*25. Apparatus for supplying ink to a ribbon-inking roller for a printing machine of the type using a transfer ribbon, comprising, a container, a supply of liquid ink in the container, an elongated wick having an end portion having an exposed surface adapted to contact an inking roller, means mounting the wick in assembly with the*

*container wtih said end portion of the wick spaced from said supply of ink, a major portion of the wick being of relatively high capillary quality for relatively abundant transfer of ink from said supply of ink, part of said major portion of the wick being immersed in said supply of ink, said end portion of the wick being impregnated with a substance that reduces but does not destroy the capillary quality of said end portion of the wick, said major portion of the wick being spaced from said exposed roller-contacting surface by the impregnated end portion of the wick, the impregnation of the end portion of the wick extending up to and terminating at said exposed surface.*

*26. Apparatus for supplying ink to a ribbon-inking roller for a printing machine of the type using a transfer ribbon, comprising, a container, a supply of liquid ink in the container, an elongated wick having an end portion having an exposed surface adapted to contact an inking roller, means mounting the wick in assembly with the container with said end portion of the wick spaced from said supply of ink, a major portion of the wick being relatively soft and of relatively high capillary quality for relatively abundant transfer of ink from said supply of ink, part of said major portion of the wick being immersed in said supply of ink, said end portion of the wick being impregnated with a hardened substance that renders said end portion substantially harder than said major portion of the wick and that reduces but does not destroy the capillary quality of said end portion of the wick, said major portion of the wick being spaced from said exposed roller contacting surface by the impregnated end portion of the wick, the impregnation of the end portion of the wick extending up to and terminating at said exposed surface.*

References Cited in the file of this patent or the original patent

UNITED STATES PATENTS

| | | |
|---|---|---|
| 900,352 | Browne | Oct. 6, 1908 |
| 1,414,865 | Delbare | May 2, 1922 |
| 1,804,976 | Fortier | May 12, 1931 |
| 1,832,007 | Eckland et al. | Nov. 17, 1931 |
| 2,400,938 | Markes | May 28, 1946 |
| 2,458,027 | Quist | Jan. 4, 1949 |
| 2,526,571 | Markes | Oct. 17, 1950 |
| 2,555,294 | Reilly | May 29, 1951 |
| 2,588,548 | Markes | Mar. 11, 1952 |
| 2,599,561 | Knight | June 10, 1952 |
| 2,620,499 | Dressel | Dec. 9, 1952 |

FOREIGN PATENTS

| | | |
|---|---|---|
| 309,027 | Great Britain | May 8, 1930 |
| 410,655 | Great Britain | May 24, 1934 |